United States Patent
Kasai

(10) Patent No.: US 12,126,384 B2
(45) Date of Patent: Oct. 22, 2024

(54) OPTICAL TRANSMITTER AND METHOD FOR CONTROLLING OPTICAL TRANSMITTER

(71) Applicant: Sumitomo Electric Device Innovations, Inc., Yokohama (JP)

(72) Inventor: Shinta Kasai, Yokohama (JP)

(73) Assignee: Sumitomo Electric Device Innovations, Inc., Yokohama (JP)

( * ) Notice: Subject to any disclaimer, the term of this patent is extended or adjusted under 35 U.S.C. 154(b) by 71 days.

(21) Appl. No.: 17/926,055

(22) PCT Filed: Jun. 7, 2021

(86) PCT No.: PCT/JP2021/021610
§ 371 (c)(1),
(2) Date: Nov. 17, 2022

(87) PCT Pub. No.: WO2021/251345
PCT Pub. Date: Dec. 16, 2021

(65) Prior Publication Data
US 2023/0188218 A1    Jun. 15, 2023

(30) Foreign Application Priority Data

Jun. 8, 2020   (JP) .................... 2020-099156

(51) Int. Cl.
*H04B 10/50*   (2013.01)
*H04B 10/516*   (2013.01)
*H04B 10/54*   (2013.01)

(52) U.S. Cl.
CPC .......... *H04B 10/516* (2013.01); *H04B 10/50* (2013.01); *H04B 10/5161* (2013.01); *H04B 10/54* (2013.01); *H04B 10/541* (2013.01)

(58) Field of Classification Search
CPC .... H04B 10/516; H04B 10/524; H04B 10/50; H04B 10/5161; H04B 10/54; H04B 10/541

(Continued)

(56) References Cited

U.S. PATENT DOCUMENTS 10,720,995 B1* 7/2020 Mazzini ............... H04L 25/4917
2015/0071651 A1* 3/2015 Asmanis ............... H04B 10/697
398/141

(Continued)

FOREIGN PATENT DOCUMENTS

| JP | 2008-113386 A | 5/2008 |
| JP | 2012-074982 A | 4/2012 |
| JP | 2017-216681 A | 12/2017 |

OTHER PUBLICATIONS

"IEEE802.3bs-2017—IEEE Standard for Ethernet—Amendment 10: Media Access Control Parameters, Physical Layers, and Management Parameters for 200 GB/s and 400 GB/s Operation", IEEE, Dec. 12, 2017, p. 104-105, 178-186.

(Continued)

*Primary Examiner* — Dibson J Sanchez
(74) *Attorney, Agent, or Firm* — McCarter & English, LLP; Michael A. Sartori

(57) ABSTRACT

An optical transmitter includes: a controller that generates a multi-level amplitude modulated signal based on transmission data that is binary data; a driver that generates a drive signal in accordance with the multi-level amplitude modulated signal; and a light emitter that generates an optical signal in accordance with the drive signal. The controller selects one of a first encoding method and a second encoding method in accordance with a switching signal. The controller generates the multi-level amplitude modulated signal by converting a bit string of M (M is an integer of 2 or more) bits included in the transmission data into a pulse signal (Continued)

having $2^M$ logic levels using a selected encoding method. The controller sets voltage values of the $2^M$ logic levels depending on the selected encoding method.

6 Claims, 12 Drawing Sheets

(58) Field of Classification Search
USPC .......................................... 398/9–38, 182–201
See application file for complete search history.

(56) References Cited

U.S. PATENT DOCUMENTS

| | | | | |
|---|---|---|---|---|
| 2015/0171963 | A1* | 6/2015 | Bhoja | H04B 10/564 398/115 |
| 2015/0222359 | A1* | 8/2015 | Kai | H04L 27/36 398/115 |
| 2015/0249501 | A1* | 9/2015 | Nagarajan | H04B 10/40 398/79 |
| 2017/0346570 | A1 | 11/2017 | Teranishi | |
| 2018/0129082 | A1* | 5/2018 | Lin | G02F 1/025 |
| 2019/0028204 | A1* | 1/2019 | Nakamura | H04Q 3/52 |
| 2019/0215077 | A1* | 7/2019 | Chien | H04L 27/3488 |
| 2020/0106529 | A1* | 4/2020 | Nakamura | H04B 10/695 |
| 2023/0171135 | A1* | 6/2023 | Gutierrez Castrejon | H04L 25/4917 375/286 |

OTHER PUBLICATIONS

FOCC Fiber Optic Co., Ltd., "The New World of 400 Gbps Ethernet, URL:http://www.focc-fiber.com/info/the-new-world-of-400-gbpsethernet-38215779.html", FOCC Fiber Optic Co., Ltd., Homepage, Aug. 19, 2019, p. 1-6.

* cited by examiner

*Fig.3*

|  | BINARY CODE | | GRAY CODE | |
|---|---|---|---|---|
| LEVEL | B2 | B1 | B2 | B1 |
| Level-3 | 1 | 1 | 1 | 0 |
| Level-2 | 1 | 0 | 1 | 1 |
| Level-1 | 0 | 1 | 0 | 1 |
| Level-0 | 0 | 0 | 0 | 0 |

*Fig.5*

|  | BINARY CODE | GRAY CODE |
|---|---|---|
| Level-2/3 | Rx1 | Rx1 |
| Level-1/2 | Rx1+Rx2 | Rx2 |
| Level-0/1 | Rx1 | Rx1 |

OPTICAL TRANSMITTER AND METHOD FOR CONTROLLING OPTICAL TRANSMITTER

TECHNICAL FIELD

The present disclosure relates to an optical transmitter and a method for controlling an optical transmitter.

BACKGROUND ART

In recent years, with the spread of smartphones, cloud computing and the like, communication capacity has been increasing. In order to increase the communication capacity, a multi-level modulation method such as a 4-level pulse amplitude modulation (PAM4) may be adopted instead of a binary modulation method such as a non-return-to-zero (NRZ). In the optical transmission of such a multi-level modulation system, there is a possibility that the optical receiver cannot accurately determine the level due to noise mixed into the optical signal.

Patent Literature 1 discloses an optical transmitter in which each level is set such that, in order to make the signal to noise (S/N) ratio at each level equal, the interval between two levels adjacent to each other increases as the extinction ratio of the multi-level modulated optical signal increases.

CITATION LIST

Patent Literature

Patent Literature 1: Japanese Unexamined Patent Publication No. 2008-113386

SUMMARY OF INVENTION

Technical Problem

For example, in PAM4, two bits of data are assigned to each level. Upon receiving the PAM4 signal, the optical receiver performs a level determination to decode two bits of data and transmits each bit to the host device in a different lane. At this time, if the PAM4 signal is erroneously determined as a level adjacent to the original level, an error occurs in at least one of the two bits (lanes). A lane in which an error occurs differs depending on between which logic levels an erroneous determination occurs. When an erroneous determination occurs between two logic levels adjacent to each other, the probability of an error occurring in a lane (error occurrence probability) differs depending on the encoding method. For example, when the encoding method is a gray code, the error occurrence probability of the lane corresponding to the first digit bit is two thirds, and the error occurrence probability of the lane corresponding to the second digit bit is one third. Therefore, in the optical transmitter described in Patent Literature 1, the S/N ratio of each level can be made uniform, but the reception sensitivity (bit error rate) between the two lanes may be non-uniform.

The present disclosure describes an optical transmitter and a method of controlling an optical transmitter capable of reducing a difference in reception sensitivity between lanes.

Solution to Problem

An optical transmitter according to one aspect of the present disclosure is an optical transmitter that outputs an optical signal which is multi-level amplitude modulated. The optical transmitter includes: a controller that generates a multi-level amplitude modulated signal based on transmission data that is binary data; a driver that generates a drive signal in accordance with the multi-level amplitude modulated signal; and a light emitter that generates the optical signal in accordance with the drive signal. The controller selects one of a first encoding method and a second encoding method in accordance with a switching signal. The controller generates the multi-level amplitude modulated signal by converting a bit string of M bits included in the transmission data into a pulse signal having $2^M$ logic levels using a selected encoding method. The controller sets voltage values of the $2^M$ logic levels depending on the selected encoding method. M is an integer of 2 or more.

Advantageous Effects of Invention

According to the present disclosure, a difference in reception sensitivity between lanes can be reduced.

BRIEF DESCRIPTION OF DRAWINGS

FIG. 3 is a diagram for explaining values of each lane in a binary code and a gray code.

FIG. 5 is a diagram showing a lane in which an error occurs when an error determination occurs between logic levels.

DESCRIPTION OF EMBODIMENTS

Description of Embodiments of Present Disclosure

Figure 1:
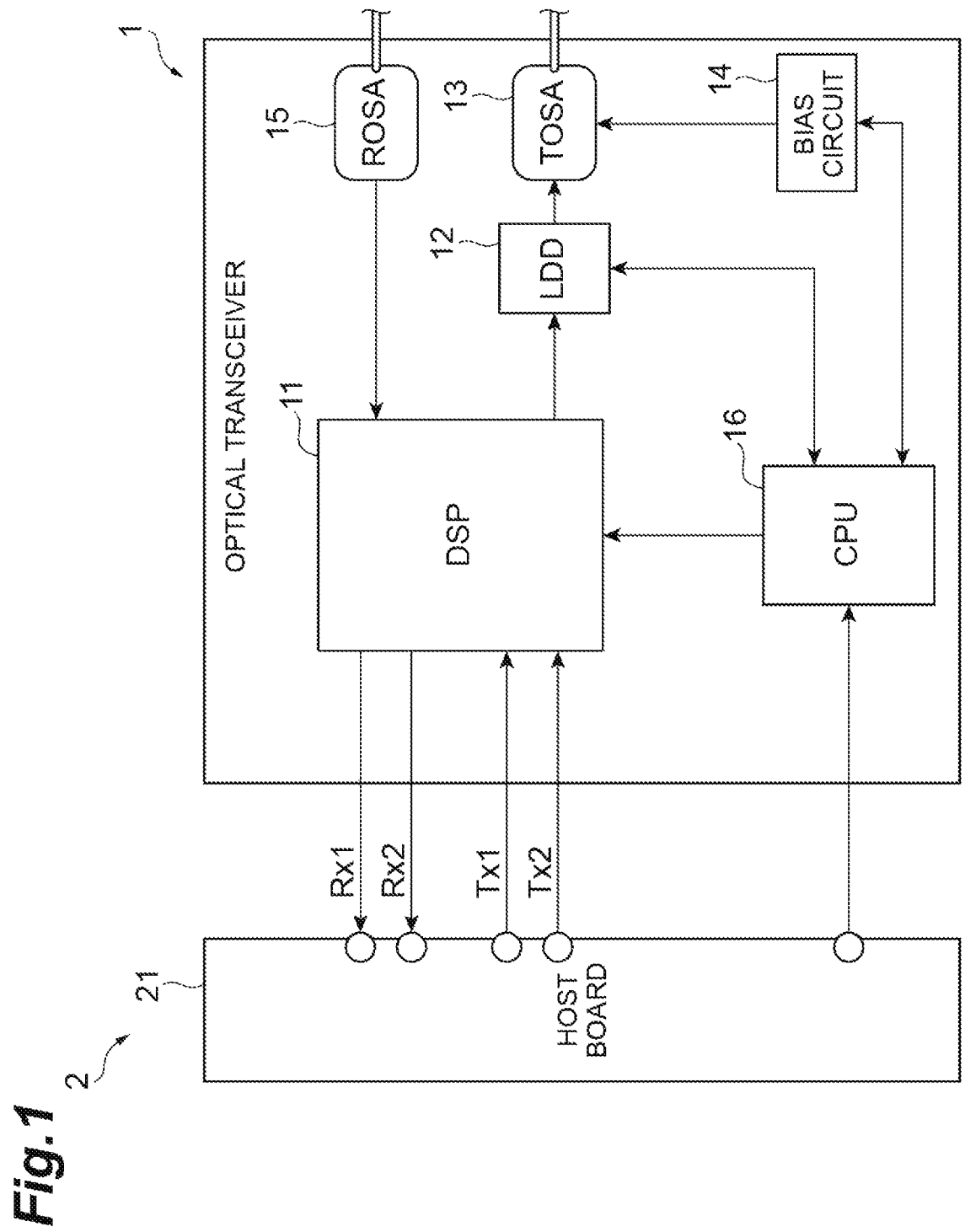
FIG. 1 is a diagram schematically showing a configuration of an optical transceiver including an optical transmitter according to an embodiment.

First, the contents of embodiments of the present disclosure will be listed and described.

An optical transmitter according to one aspect of the present disclosure is an optical transmitter that outputs an optical signal which is multi-level amplitude modulated. The optical transmitter includes: a controller that generates a multi-level amplitude modulated signal based on transmission data that is binary data; a driver that generates a drive signal in accordance with the multi-level amplitude modulated signal; and a light emitter that generates the optical signal in accordance with the drive signal. The controller selects one of a first encoding method and a second encoding method in accordance with a switching signal. The controller generates the multi-level amplitude modulated signal by converting a bit string of M bits included in the transmission data into a pulse signal having $2^M$ logic levels using a selected encoding method. The controller sets voltage values of the $2^M$ logic levels depending on the selected encoding method. M is an integer of 2 or more.

In this optical transmitter, a multi-level amplitude modulated signal is generated by converting a bit string of M bits included in transmission data into a pulse signal having $2^M$ logic levels, a drive signal is generated in accordance with the multi-level amplitude modulated signal, and an optical signal is generated in accordance with the drive signal. In an optical receiver, the optical signal is converted into a multi-level amplitude modulated signal, and the multi-level amplitude modulated signal is decoded into the bit string of M bits, and the M bits can be transmitted via different lanes. In the optical transmitter, voltage values of $2^M$ logic levels are set depending on the encoding method selected from the first encoding method and the second encoding method. For example, the difference in bit error rate between M lanes can be reduced by setting the voltage value of each logic level in accordance with the error occurrence probability between the lanes. As a result, the difference in reception sensitivity between the lanes can be reduced. In addition, two encoding methods can be used without increasing the difference in reception sensitivity between the lanes.

The controller may set the voltage values of the $2^M$ logic levels so that bit error rates of first to M-th bits included in the M bits are equal to each other. In an optical receiver, the optical signal is converted into a multi-level amplitude modulated signal, and the multi-level amplitude modulated signal is decoded into the bit string of M bits, and the M bits can be transmitted via different lanes. In this case, in the above configuration, since the voltage values of the $2^M$ logic levels are set so that the bit error rates of the first to the M-th bits are equal to each other, the difference in bit error rate between the M lanes is reduced. This makes it possible to reduce the difference in reception sensitivity between the lanes.

The controller may set the voltage values of the $2^M$ logic levels in accordance with an error occurrence probability that is a probability that an error occurs in each bit of the bit string when an erroneous determination occurs between two logic levels adjacent to each other among the $2^M$ logic levels. As the voltage difference between two logic levels adjacent to each other increases, the possibility that an erroneous determination occurs between the two logic levels decreases. For example, by increasing the voltage difference between two logic levels different from each other in a bit with a high error occurrence probability, the bit error rate of the bit is reduced. As described above, by setting the voltage values of the $2^M$ logic levels in accordance with the error occurrence probability, the difference in reception sensitivity between the lanes can be reduced.

When the error occurrence probability of a first bit of the bit string is higher than the error occurrence probability of a second bit of the bit string, the controller may set the voltage values of the $2^M$ logic levels so that a voltage difference between two logic levels different from each other in the first bit is larger than a voltage difference between other two logic levels different from each other in the second bit. As the voltage difference between two logic levels adjacent to each other increases, the possibility that an erroneous determination occurs between the two logic levels decreases. Therefore, the difference between the bit error rate of the first bit and the bit error rate of the second bit is reduced by making the voltage difference between two logic levels different from each other in the first bit larger than the voltage difference between other two logic levels different from each other in the second bit. As a result, the difference in reception sensitivity between the lanes can be reduced.

The first encoding method may be a gray code. The $2^M$ logic levels may include a first logic level that is a lowest logic level, a second logic level that is a second lowest logic level, and a third logic level that is a third lowest logic level. The controller may set the voltage values of the $2^M$ logic levels so that a voltage difference between the first logic level and the second logic level when the first encoding method is selected is larger than a voltage difference between the second logic level and the third logic level. In the gray code, a bit which is changed between the first logic level and the second logic level has a higher rate (number of times) of change between two logic levels adjacent to each other than a bit which is changed between the second logic level and the third logic level. Therefore, when the voltage difference between the first logic level and the second logic level is the same as the voltage difference between the second logic level and the third logic level, the bit error rate of the bit which is changed between the first logic level and the second logic level is higher than the bit error rate of the bit which is changed between the second logic level and the third logic level. With respect to this problem, according to the above-described configuration, the possibility that an erroneous determination occurs between the first logic level and the second logic level can be reduced compared with the possibility that an erroneous determination occurs between the second logic level and the third logic level. This makes it possible to reduce a difference between the bit error rate of the bit which is changed between the first logic level and the second logic level and the bit error rate of the bit which is changed between the second logic level and the third logic level. As a result, the difference in reception sensitivity between the lanes can be reduced.

The first encoding method may be a gray code, and the second encoding method may be a binary code. In this case, it is possible to provide an optical transmitter conforming to Institute of Electrical and Electronics Engineers (IEEE) P802.3bs.

The $2^M$ logic levels may include a first logic level that is a lowest logic level, a second logic level that is a second lowest logic level, and a third logic level that is a third lowest logic level. The controller may set the voltage values of the $2^M$ logic levels so that a voltage difference between the second logic level and the third logic level when the first encoding method is selected is smaller than a voltage difference between the second logic level and the third logic level when the second encoding method is selected.

In the binary code, when the voltage difference between the first logic level and the second logic level is equal to the voltage difference between the second logic level and the third logic level, the bit error rates of the first to the M-th bits included in the bit string can be equalized. In the gray code, a bit which is changed between the first logic level and the second logic level has a higher rate (number of times) of change between two logic levels adjacent to each other than a bit which is changed between the second logic level and the third logic level. Therefore, in the gray code, when the voltage difference between the first logic level and the second logic level is the same as the voltage difference between the second logic level and the third logic level, the bit error rate of the bit which is changed between the first logic level and the second logic level is higher than the bit error rate of the bit which is changed between the second logic level and the third logic level. With respect to this problem, according to the above-described configuration, when the gray code is selected as the encoding method, the possibility that an erroneous determination occurs between the first logic level and the second logic level can be reduced compared with the possibility that an erroneous determination occurs between the second logic level and the third logic level. This makes it possible to reduce a difference between the bit error rate of the bit which is changed between the first logic level and the second logic level and the bit error rate of the bit which is changed between the second logic level and the third logic level. As a result, when the gray code is selected as the encoding method, the difference in reception sensitivity between the lanes can be reduced.

A method for controlling an optical transmitter according to another aspect of the present disclosure is a method for controlling an optical transmitter that outputs an optical signal which is multi-level amplitude modulated. The control method includes: a step of generating a multi-level amplitude modulated signal based on transmission data that is binary data; a step of generating a drive signal in accordance with the multi-level amplitude modulated signal; and a step of generating the optical signal in accordance with the drive signal. In the step of generating the multi-level amplitude modulated signal, one of a first encoding method and a second encoding method is selected in accordance with a switching signal, and the multi-level amplitude modulated signal is generated by converting a bit string of M bits included in the transmission data into a pulse signal having $2^M$ logic levels using a selected encoding method. Voltage values of the $2^M$ logic levels are set depending on the selected encoding method. M is an integer of 2 or more.

In this method for controlling an optical transmitter, a multi-level amplitude modulated signal is generated by converting a bit string of M bits included in transmission data into a pulse signal having $2^M$ logic levels, a drive signal is generated in accordance with the multi-level amplitude modulated signal, and an optical signal is generated in accordance with the drive signal. In an optical receiver, the optical signal is converted into a multi-level amplitude modulated signal, and the multi-level amplitude modulated signal is decoded into the bit string of M bits, and the M bits can be transmitted via different lanes. In the optical transmitter, voltage values of $2^M$ logic levels are set depending on the encoding method selected from the first encoding method and the second encoding method. For example, the difference in bit error rate between M lanes can be reduced by setting the voltage value of each logic level in accordance with the error occurrence probability between the lanes. As a result, the difference in reception sensitivity between the lanes can be reduced. In addition, two encoding methods can be used without increasing the difference in reception sensitivity between the lanes.

Details of Embodiments of Present Disclosure

Specific examples of an optical transmitter and a method for controlling an optical transmitter according to an embodiment of the present disclosure will be described below with reference to the drawings. The present disclosure is not limited to these examples, but is defined by the scope of the claims. The present disclosure is intended to include all modifications within the meanings and scope equivalent to the scope of the claims.

Figure 2:
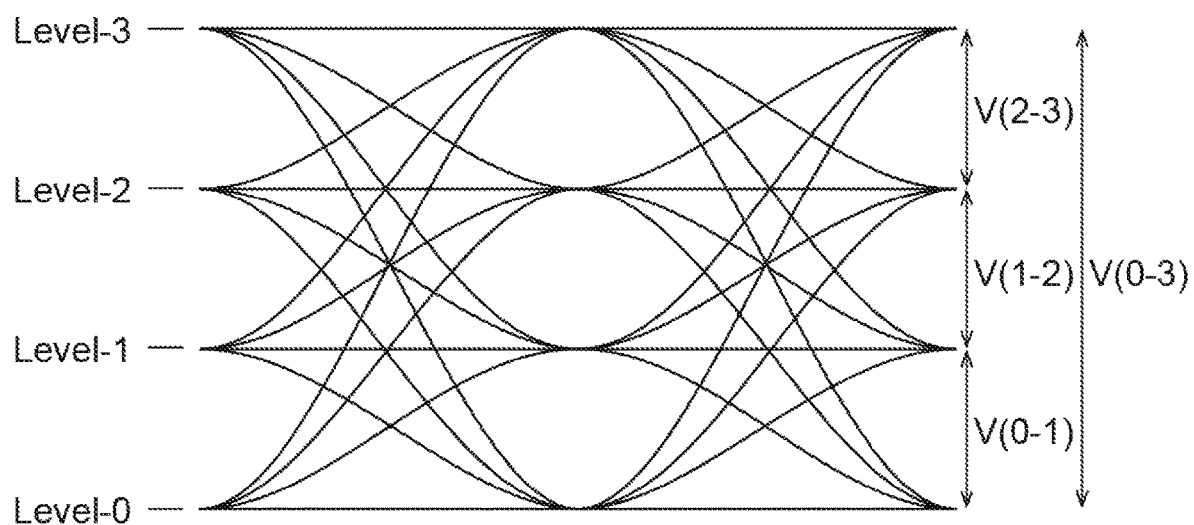
FIG. 2 is a diagram showing an example of an eye pattern of a PAM4 signal.
Figure 4:
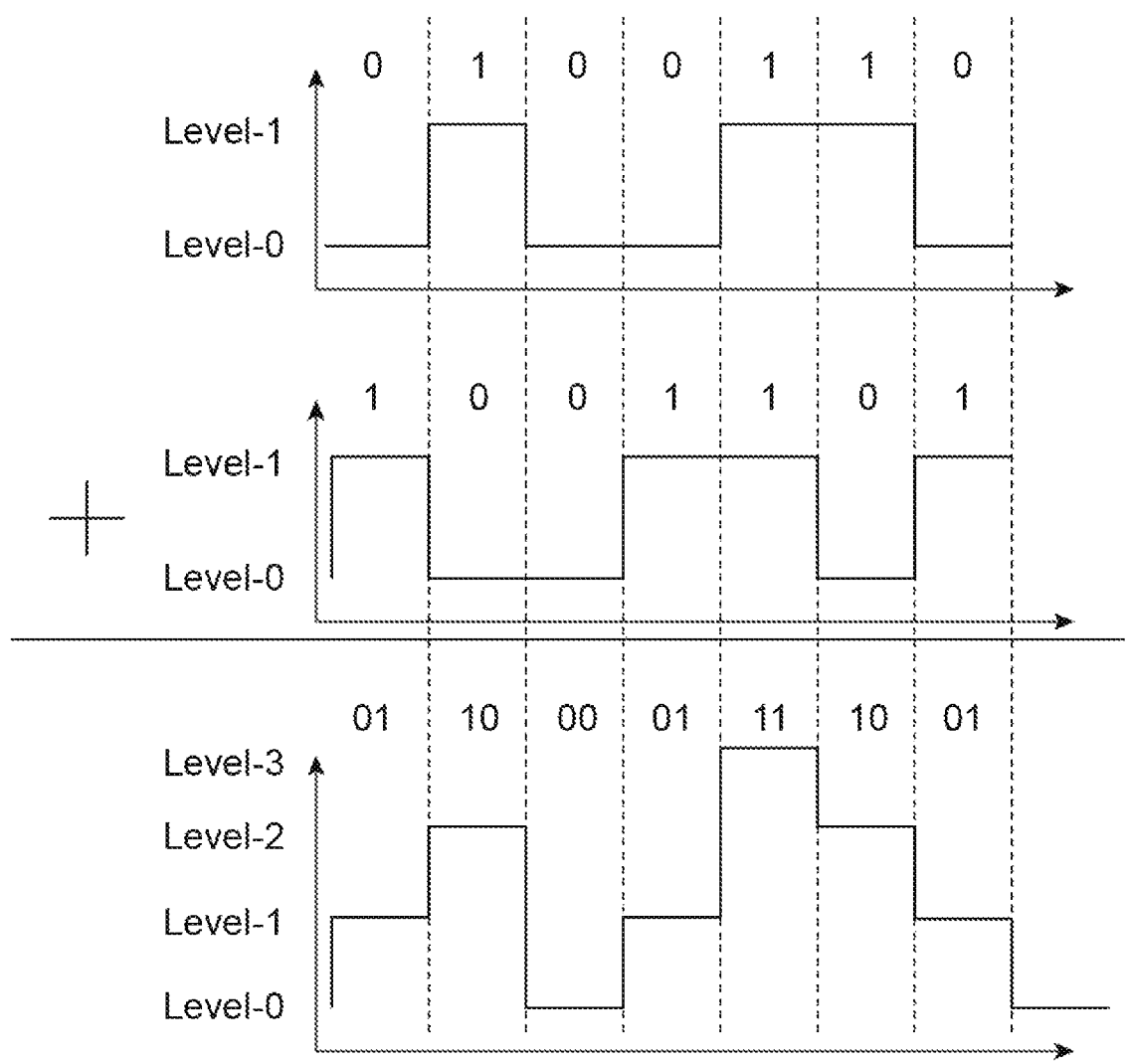
FIG. 4 is a diagram for explaining 4-level pulse amplitude modulation performed by the digital signal processor (DSP) shown in FIG. 1.

FIG. 1 is a diagram schematically showing a configuration of an optical transceiver including an optical transmitter according to an embodiment. FIG. 2 is a diagram showing an example of an eye pattern of a PAM4 signal. FIG. 3 is a diagram for explaining values of each lane in a binary code and a gray code. FIG. 4 is a diagram for explaining 4-level pulse amplitude modulation performed by the DSP shown in FIG. 1.

An optical transceiver 1 (optical transmitter) shown in FIG. 1 is an optical transceiver that realizes transmission of 53 Gbps, for example, and complies with the Quad Small Form-factor Pluggable (QSFP) 28 standard. The optical transceiver 1 is communicatively connected to another optical transceiver via an optical fiber cable. The optical transceiver 1 transmits the multi-level amplitude modulated optical signal to another optical transceiver and receives the multi-level amplitude modulated optical signal from another optical transceiver. In the present embodiment, 4-level pulse amplitude modulation (PAM4) is used as multi-level amplitude modulation. The optical transceiver 1 is communicatively connected to a host device 2.

The host device 2 is a host device, and monitors and controls the optical transceiver 1. The host device 2 includes a host board 21 for communicating with the optical transceiver 1. The host board 21 transmits transmission data to the optical transceiver 1 through lanes Tx1 and Tx2 which are transmission channels. The host board 21 receives reception data from the optical transceiver 1 through lanes Rx1 and Rx2 which are reception channels. The transmission data transmitted in the lanes Tx1 and Tx2 and the reception data transmitted in the lanes Rx1 and Rx2 are binary modulated electrical signals. For example, a non-return-to-zero (NRZ) is used as a binary modulation method.

Specifically, the host board 21 transmits transmission data in synchronization one bit at a time through the lanes Tx1 and Tx2. The host board 21 receives the reception data from the optical transceiver 1 in synchronization one bit at a time through the lanes Rx1 and Rx2 which are reception channels. Each lane (lanes Tx1, Tx2, Rx1 and Rx2) transmits data at a transmission rate of 26.5 Gbps. In order to realize transmission of 400 Gbps, eight sets of lanes Tx1, Tx2, Rx1 and Rx2 may be provided. The host board 21 transmits a switching signal to the optical transceiver 1 using serial communication. The switching signal is a signal indicating whether or not the gray code is used. Examples of serial communication include Inter-Integrated Circuit (I²C) and Management Data Input/Output (MDIO).

The optical transceiver 1 includes a DSP 11 (controller), a drive circuit 12 (driver), a transmitter optical sub-assembly (TOSA) 13 (light emitter), a bias circuit 14, a receiver optical sub-assembly (ROSA) 15, and a central processing unit (CPU) 16.

The DSP 11 is a device for performing signal processing. The DSP 11 generates a PAM4 signal (multi-level amplitude modulated signal), which is an electrical signal, based on transmission data received from the host device 2. The PAM4 signal is transmitted, for example, at 26.5 Gbaud. As shown in FIG. 2, the PAM4 signal has four logic levels (voltage levels) of Level-0, Level-1, Level-2, and Level-3. A logic level may be referred to as a symbol. Level-0 to Level-3 increase in the order of Level-0, Level-1, Level-2, and Level-3. That is, Level-0 is the lowest logic level, Level-1 is the second lowest logic level, Level-2 is the third lowest logic level, and Level-3 is the highest logic level.

The DSP 11 converts the transmission data for two lanes into the PAM4 signal for one lane by using a predetermined encoding method. In the present embodiment, the DSP 11 can use a gray code (first encoding method) and a binary code (second encoding method) as encoding methods. The CPU 16 sets which one of the gray code and the binary code is used as the encoding method. The DSP 11 selects either the gray code or the binary code as an encoding method in accordance with the switching signal output from the host board 21. The gray code is an encoding method in which the Hamming distance between two codes (bit strings) assigned to two symbols adjacent to each other in the front-back direction is 1. Depending on the combination (B2, B1) of the bit B2 of the lane Tx2 and the bit B1 of the lane Tx1 received simultaneously from the host board 21, the DSP 11 converts the combination (B2, B1) into a pulse having one of the logic levels of Level-0, Level-1, Level-2 and Level-3.

A case where the binary code is selected as the encoding method will be described. As shown in FIGS. 3 and 4, when the combination (B2, B1) is (0,0), the DSP 11 generates a pulse of Level-0. When the combination (B2, B1) is (0,1), the DSP 11 generates a pulse of Level-1. When the combination (B2, B1) is (1,0), the DSP 11 generates a pulse of Level-2. When the combination (B2, B1) is (1, 1), the DSP 11 generates a pulse of Level-3.

A case where the gray code is selected as the encoding method will be described. As shown in FIG. 3, when the combination (B2, B1) is (0,0), the DSP 11 generates a pulse of Level-0. When the combination (B2, B1) is (0,1), the DSP 11 generates a pulse of Level-1. When the combination (B2, B1) is (1, 1), the DSP 11 generates a pulse of Level-2. When the combination (B2, B1) is (1,0), the DSP 11 generates a pulse of Level-3.

The DSP 11 generates a PAM4 signal by performing the above-mentioned conversion every time the DSP 11 receives one bit from each lane. The DSP 11 outputs the PAM4 signal to the drive circuit 12. Note that the CPU 16 sets the voltage value (output amplitude) of each logic level depending on the selected encoding method in the register of the DSP 11. The DSP 11 generates a pulse having an amplitude of a voltage value set in the register.

The DSP 11 generates reception data based on a PAM4 signal, which is an electrical signal received from the ROSA 15. Specifically, the DSP 11 converts the PAM4 signal for one lane into the reception data for two lanes by using a predetermined encoding method. As described above, in the present embodiment, the DSP 11 can use the gray code and the binary code as the encoding method. The DSP 11 determines a logic level for each symbol (pulse) of the PAM4 signal received from the ROSA 15, and generates a combination (B2, B1) of the bit B2 of the lane Rx2 and the bit B1 of the lane Rx1 in accordance with the logic level. The DSP 11 determines which logic level the symbol corresponds to by comparing the voltage value of the symbol with the threshold voltage set in advance.

A case where the binary code is selected as the encoding method will be described. As shown in FIG. 3, when the logic level is Level-0, the DSP 11 generates (0,0) as the combination (B2, B1). When the logic level is Level-1, the DSP 11 generates (0,1) as the combination (B2, B1). When the logic level is Level-2, the DSP 11 generates (1,0) as the combination (B2, B1). When the logic level is Level-3, the DSP 11 generates (1, 1) as the combination (B2, B1).

A case where the gray code is selected as the encoding method will be described. As shown in FIG. 3, when the logic level is Level-0, the DSP 11 generates (0,0) as the combination (B2, B1). When the logic level is Level-1, the DSP 11 generates (0,1) as the combination (B2, B1). When the logic level is Level-2, the DSP 11 generates (1, 1) as the combination (B2, B1). When the logic level is Level-3, the DSP 11 generates (1, 0) as the combination (B2, B1).

The DSP 11 transmits the bit B1 to the host device 2 via the lane Rx1, and transmits the bit B2 to the host device 2 via the lane Rx2. The DSP 11 synchronizes the transmission of the bit B1 with that of the bit B2.

The drive circuit 12 is a circuit that drives a laser diode included in the TOSA 13. The drive circuit 12 generates a drive signal, which is an electric signal, in accordance with the PAM4 signal, and outputs the drive signal to the TOSA 13. The drive circuit 12 may be built in the TOSA 13.

The TOSA 13 is an optical transmission module that generates an optical signal in accordance with the drive signal and transmits the optical signal to another optical transceiver via an optical fiber cable. The TOSA 13 includes a laser diode which is a light emitting element for generating an optical signal. The laser diode is driven by a drive signal and outputs an optical signal in accordance with the drive signal. Examples of the laser diode include a directly modulated laser diode (DML) and an electro-absorption modulator integrated with distributed feedback laser diode (EML). Here, a case where EML is used will be described as an example. The EML includes a laser diode and an electro-absorption (EA) modulator. A DC electric current is supplied to the anode of the laser diode, and the laser diode generates continuous wave (CW) light. The EA modulator modulates CW light based on the drive signal.

The bias circuit 14 is a circuit for applying a direct current (DC) bias voltage to the EA modulator included in the TOSA 13 for waveform adjustment. The bias circuit 14 adjusts the DC bias voltage based on a control signal output from the CPU 16. When DML is used as the laser diode of the TOSA 13, the bias circuit 14 adjusts the bias electric current supplied to the DML based on the control signal output from the CPU 16 for waveform adjustment.

The ROSA 15 is an optical reception module that receives an optical signal from a TOSA of another optical transceiver via an optical fiber cable and converts the optical signal into a PAM4 signal which is an electrical signal. The optical signal is a PAM4 optical signal of 26.5 Gbaud. The ROSA 15 includes a photoelectric conversion element for converting an optical signal into an electrical signal, and an amplifier. Examples of the photoelectric conversion element include a PIN photo diode (PIN-PD) and an avalanche photo diode (APD). The amplifier is a circuit for generating a PAM4 signal by amplifying an electric signal output from the photoelectric conversion element. The amplifier is, for example, a linear transimpedance amplifier (TIA).

The CPU 16 is a device that controls the entire optical transceiver 1. The CPU 16 performs a setting depending on the encoding method. The CPU 16 receives the switching signal from the host board 21, and sets an encoding method corresponding to the switching signal and a voltage value of each logic level depending on the encoding method in the DSP 11. The voltage value of each logic level is predetermined for each encoding method and stored in a memory (not shown). The CPU 16 reads a voltage value corresponding to the selected encoding method from the memory and sets the read voltage value. Specifically, when the switching signal indicates that the gray code is used, the CPU 16 sets the gray code as the encoding method in the DSP 11, and reads out the voltage value of each logic level corresponding to the gray code from the memory to set it in the DSP 11. When the switching signal indicates that the gray code is not used, the CPU 16 sets the binary code as the encoding method in the DSP 11, and reads out the voltage value of each logic level corresponding to the binary code from the memory to set it in the DSP 11.

Figure 6:
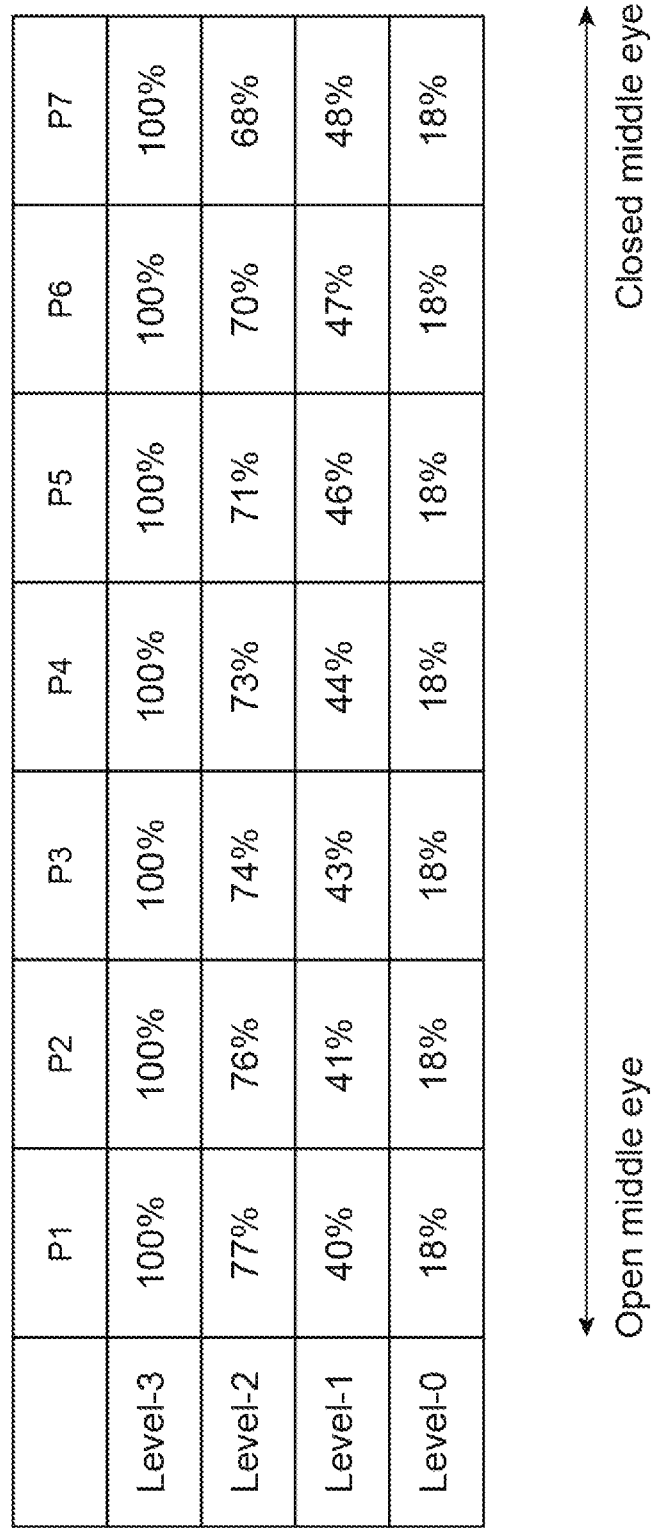
FIG. 6 is a diagram showing combinations of voltage values of logic levels.
Figure 7:
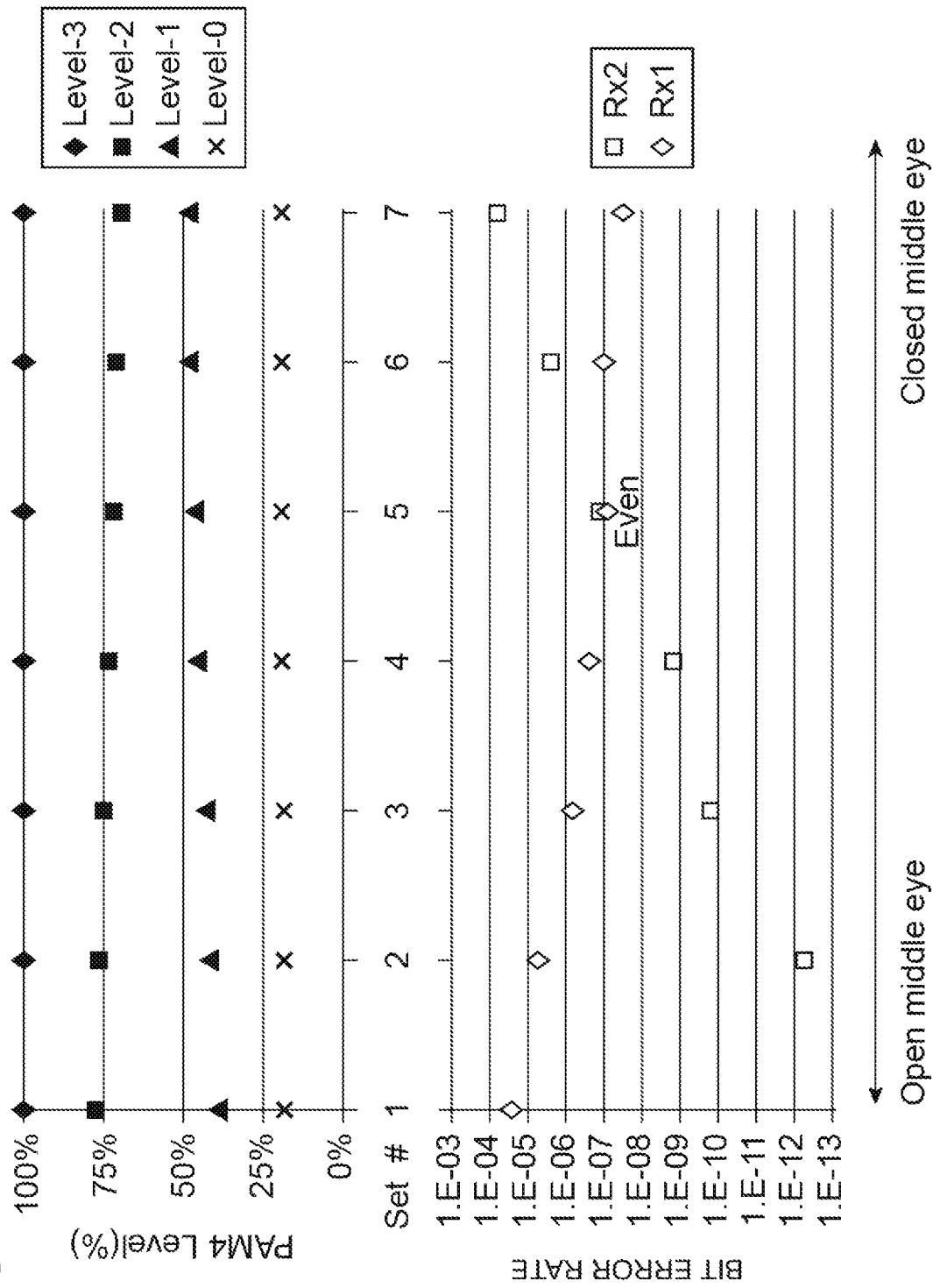
FIG. 7 is a diagram showing a bit error rate when each voltage value shown in FIG. 6 is used.
Figure 8:
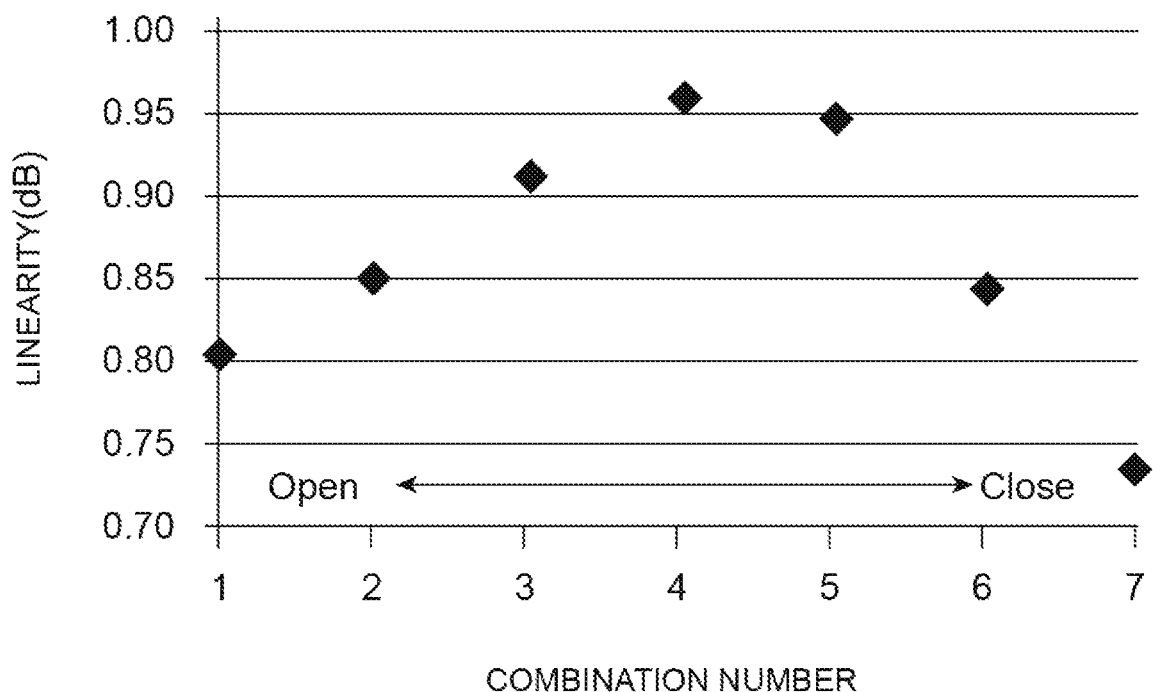
FIG. 8 is a diagram showing linearity when each voltage value shown in FIG. 6 is used.
Figure 9:
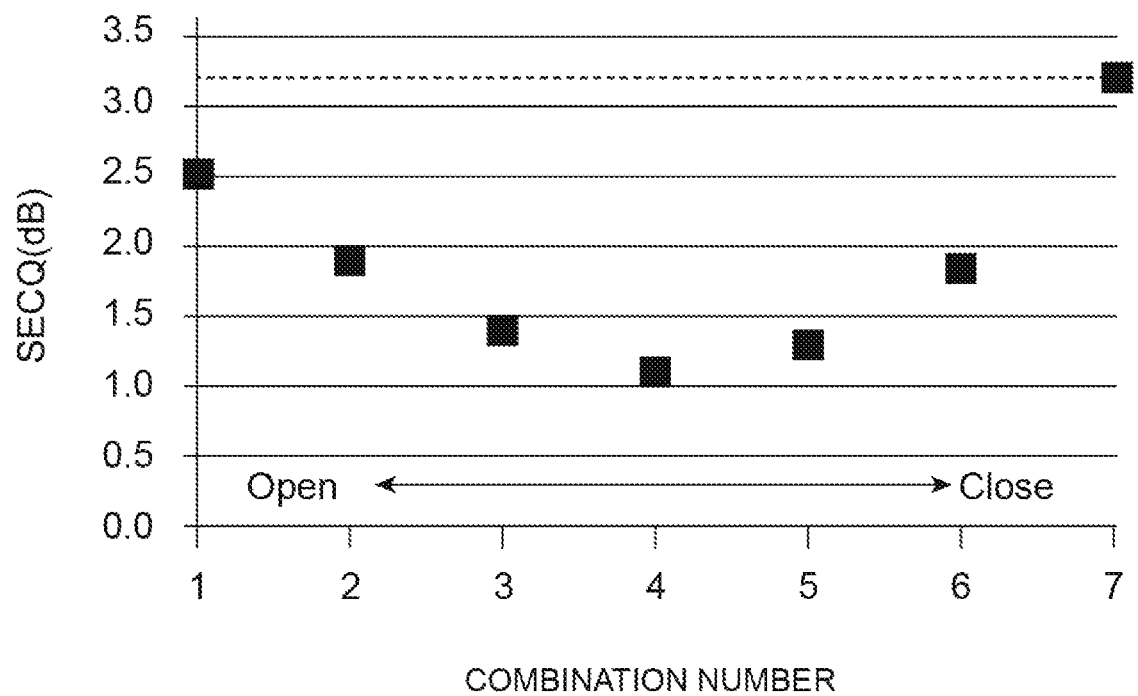
FIG. 9 is a diagram showing a stressed eye closure for PAM4 (SECQ) when each voltage value shown in FIG. 6 is used.

Next, a method for determining the optimum voltage value of each logic level corresponding to the encoding method will be described. FIG. 5 is a diagram showing a lane in which an error occurs when an error determination occurs between logic levels. FIG. 6 is a diagram showing combinations of voltage values of logic levels. FIG. 7 is a diagram showing a bit error rate when each voltage value shown in FIG. 6 is used. FIG. 8 is a diagram showing linearity when each voltage value shown in FIG. 6 is used. FIG. 9 is a diagram showing a SECQ when each voltage value shown in FIG. 6 is used.

As described above, the optical transceiver 1 transmits the optical signal subjected to the 4-level pulse amplitude modulation to another optical transceiver. Upon receiving the optical signal, another optical transceiver converts the optical signal into an electrical signal by a photoelectric conversion element, and amplifies the electrical signal by an amplifier, thereby generating a PAM4 signal. The DSP of another optical transceiver determines the logic level of each symbol (pulse) of the PAM4 signal. At this time, the DSP may determine that the logic level of the symbol is a logic level adjacent to the original logic level. In this case, at least one of bit B2 and bit B1 has an erroneous value.

The case where the binary code is selected as the encoding method will be described in detail. As shown in FIG. 3, the combination (B2, B1) when the logic level is Level-0 is (0,0), and the combination (B2, B1) when the logic level is Level-1 is (0,1). Therefore, as shown in FIG. 5, in an erroneous determination between Level-0 and Level-1, bit B1 has an erroneous value, so that an error occurs in the lane Rx1. The erroneous determination between Level-0 and Level-1 occurs when Level-0 is determined to be Level-1 and when Level-1 is determined to be Level-0. Similarly, in an erroneous determination between Level-1 and Level-2, both bit B1 and bit B2 have erroneous values, so that errors occur in the lane Rx1 and the lane Rx2. In an erroneous determination between Level-2 and Level-3, bit B1 has an erroneous value, so that an error occurs in the lane Rx1.

The case where the gray code is selected as the encoding method will be described in detail. As shown in FIG. 5, in an erroneous determination between Level-0 and Level-1, bit B1 has an erroneous value, so that an error occurs in the lane Rx1. In an erroneous determination between Level-1 and Level-2, bit B2 has an erroneous value, so that an error occurs in the lane Rx2. In an erroneous determination between Level-2 and Level-3, bit B1 has an erroneous value, so that an error occurs in the lane Rx1.

As described above, a lane in which an error occurs differs depending on between which logic levels an error occurs. For example, when it is assumed that the signal to noise (S/N) ratio at each logic level is constant and the number of occurrences of symbols is uniform, the error occurrence probability of bit B2 (lane Rx2) is one third and the error occurrence probability of bit B1 (lane Rx1) is 1 in the binary code. The error occurrence probability of a bit (lane) is a probability that an error occurs in the bit (lane) when an error determination occurs between logic levels. Under the same conditions, in the gray code, the error occurrence probability of bit B2 (lane Rx2) is one third and the error occurrence probability of bit B1 (lane Rx1) is two thirds.

When the voltage difference V(0–1) between the voltage value of Level-0 and the voltage value of Level-1, the voltage difference V(1–2) between the voltage value of Level-1 and the voltage value of Level-2, and the voltage difference V(2–3) between the voltage value of Level-2 and the voltage value of Level-3 are equal to each other, the ratio between the bit error rate of the lane Rx1 and the bit error rate of the lane Rx2 substantially coincides with the ratio between the error occurrence probabilities of the lanes Rx1 and Rx2. When the voltage difference between two logic levels adjacent to each other becomes small, the possibility that an erroneous determination occurs between the two logic levels increases. Thus, the bit error rate of each lane can vary depending on the voltage difference between two logic levels adjacent to each other.

The reception sensitivity is defined by the sum of the bit error rates of the lane Rx1 and the lane Rx2. However, in actual use, when the difference between the bit error rate (reception sensitivity) of the lane Rx1 and that of the lane Rx2 becomes large, there is a high possibility that RxLOL (Loss of Lock) and Synchronize Loss occur in the lane having the lower reception sensitivity in the host device. The LOL is in a state in which signals cannot be locked by a phase locked loop (PLL) such as an application specific integrated circuit (ASIC) and a clock data recovery (CDR) on the host board side. Therefore, it is desirable that the reception sensitivity is equalized between the lanes Rx1 and Rx2.

Therefore, the bit error rates of the lanes Rx1 and Rx2 were measured using combinations (combinations P1 to P7) of the voltage values of logic levels shown in FIG. 6 to be selected the optimum combination. The voltage supplied to the optical transceiver 1 was set to 3.3 V, the ambient temperature was set to 35 degrees, the extinction ratio of the optical signal was set to 8 dB, and the bit error rate was measured. The voltage supplied to the optical transceiver 1 is converted into a voltage suitable for the DSP 11 by a DC/DC converter in the optical transceiver 1. The TOSA 13 and the ROSA 15 were connected back-to-back. The optical power (intensity) of the optical signal was set to an arbitrary value.

Here, the voltage value of each logic level is expressed as a ratio (unit: %) to the voltage value of Level-3, with the voltage value of Level-3 as a fixed value. That is, the voltage value of Level-3 is 100%. In the combinations shown in FIG. 6, the voltage value of Level-0 is also set to a fixed value (18%). Therefore, the voltage difference V(0–3) between the voltage value of Level-0 and the voltage value of Level-3 is constant. The voltage values of Level-1 and Level-2 are set so that the eye opening between Level-1 and Level-2 becomes smaller as the combination number increases. Therefore, in the combination P1, the eye opening between Level-1 and Level-2 is the largest, and in the combination P7, the eye opening between Level-1 and Level-2 is the smallest. The voltage values of Level-1 and Level-2 of each combination are set so as to be substantially symmetrical with respect to the symmetric line between Level-0 and Level-3.

As shown in FIG. 7, when the gray code was selected as the encoding method, the bit error rate of the lane Rx2 increased and the bit error rate of the lane Rx1 decreased as the combination number increased. In other words, as the voltage difference V(0–1) and the voltage difference V(2–3) decrease and the voltage difference V(1–2) increases, the bit error rate of the lane Rx2 decreases and the bit error rate of the lane Rx1 increases. On the other hand, as the voltage difference V(0–1) and the voltage difference V(2–3) increase and the voltage difference V(1–2) decreases, the bit error rate of the lane Rx2 increases and the bit error rate of the lane Rx1 decreases.

As described above, since the error occurrence probability of the lane Rx2 is lower than the error occurrence probability of the lane Rx1, by making the voltage difference V(1–2) smaller than the voltage difference V(0–1) and the voltage difference V(2–3), the difference between the bit error rate of the lane Rx1 and the bit error rate of the lane Rx2 is reduced. In the test result shown in FIG. 7, in the combination P5, the bit error rate of the lane Rx1 was substantially equal to the bit error rate of the lane Rx2. In the combination P5, the voltage difference V(1–2) is about 3% smaller than the voltage difference V(0–1) and the voltage difference V(2–3). Therefore, when the gray code is selected as the encoding method, the reception sensitivity is optimized by setting the voltage values of the combination P5.

When the binary code was selected as the encoding method, the bit error rate of the lane Rx1 was substantially equal to the bit error rate of the lane Rx2 in the combination P4 in which the voltage difference V(0–1), the voltage difference V(1–2) and the voltage difference V(2–3) were substantially equal to each other. Therefore, when the binary code is selected as the encoding method, the reception sensitivity is optimized by setting the voltage values of the combination P4. Therefore, the voltage value of Level-1 when the gray code is selected is about 1% to 4% larger than the voltage value of Level-1 when the binary code is selected. The voltage value of Level-2 when the gray code is selected is about 1% to 4% smaller than the voltage value of Level-2 when the binary code is selected.

Note that the linearity and the SECQ are required for the waveform of the PAM4 signal. The linearity is one of the indexes of waveform quality and indicates the linearity of an eye pattern. The linearity is a positive value less than or equal to 1, and a value closer to 1 indicates an ideal eye pattern. The SECQ is one of the indexes of waveform quality and indicates the waveform quality before transmission. A smaller SECQ value means less noise. The linearity is required to be greater than 0.75 dB and the SECQ is required to be less than 3.2 dB. As shown in FIGS. 8 and 9, the combinations P1 to P6 meet the specifications of the linearity and the SECQ.

As described above, the voltage value of each logic level is determined in advance by a test for each encoding method so that the sensitivity is optimized, and each voltage value is stored in a memory (not shown). In the example shown in FIG. 6, the voltage values of Level-0 and Level-3 are fixed values, but all the voltage values of Level-0 to Level-3 may be changed.

Figure 10:
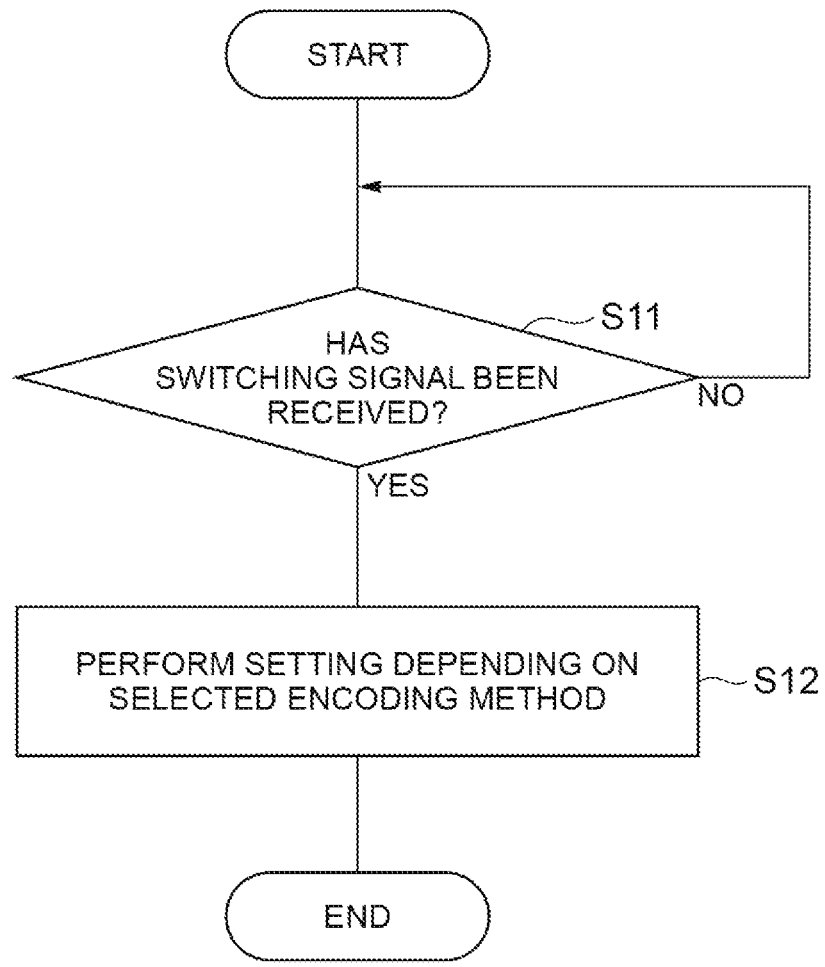
FIG. 10 is a flowchart showing a setting process performed by the optical transceiver shown in FIG. 1.
Figure 11:
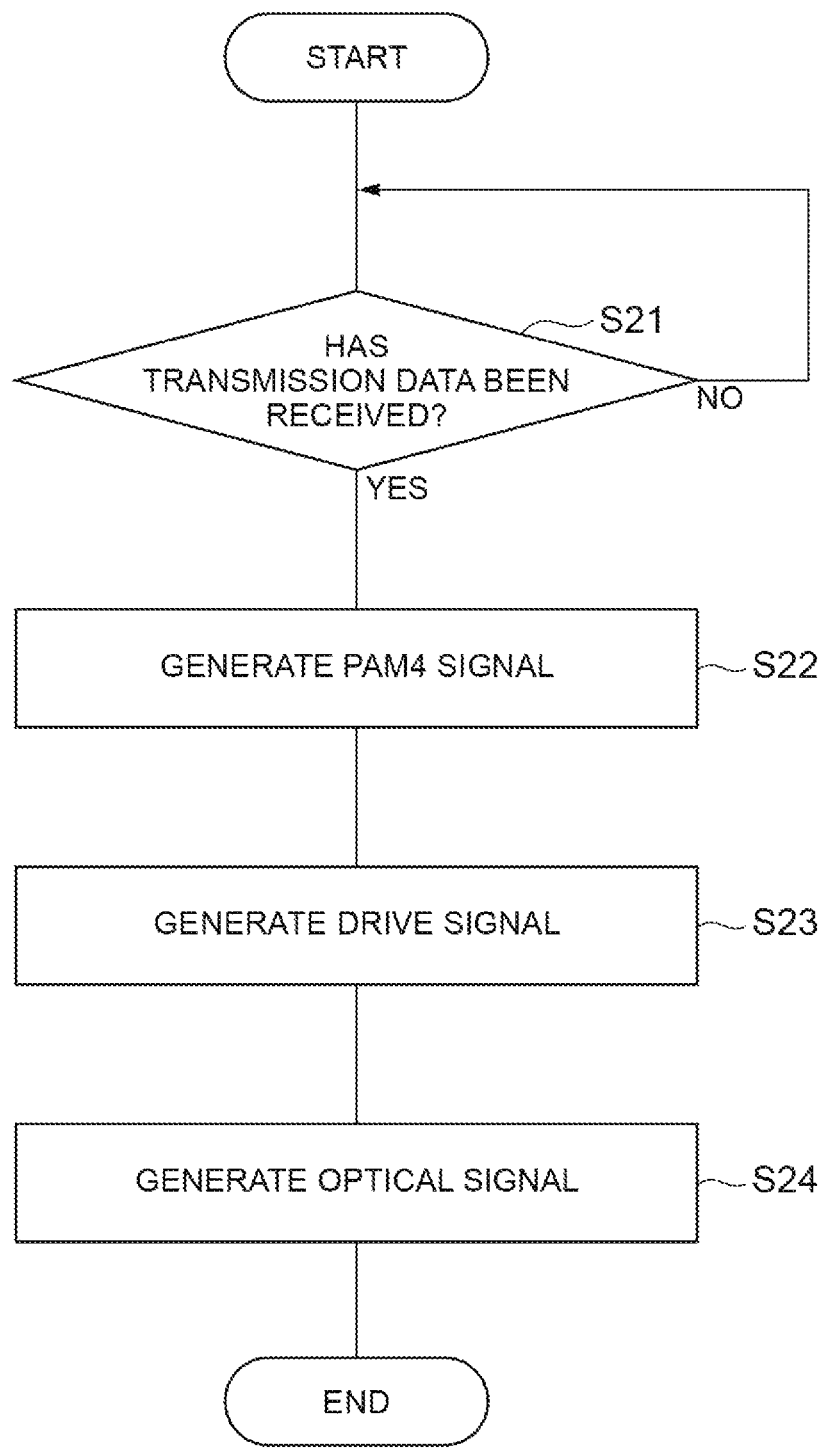
FIG. 11 is a flowchart showing a transmission control process performed by the optical transceiver shown in FIG. 1.
Figure 12:
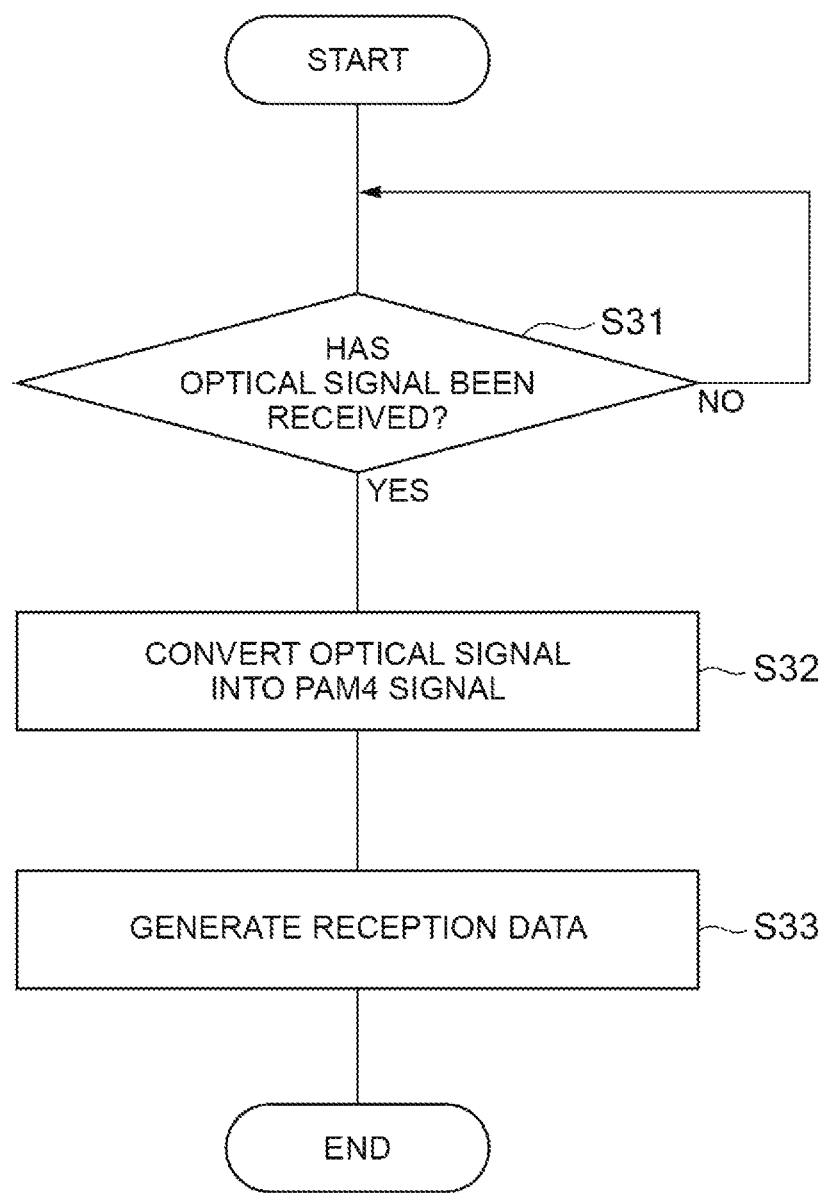
FIG. 12 is a flow chart showing a reception control process performed by the optical transceiver shown in FIG. 1.

Next, various processes performed by the optical transceiver 1 will be described. FIG. 10 is a flowchart showing a setting process performed by the optical transceiver shown in FIG. 1. FIG. 11 is a flowchart showing a transmission control process performed by the optical transceiver shown in FIG. 1. FIG. 12 is a flow chart showing a reception control process performed by the optical transceiver shown in FIG. 1.

In the setting process shown in FIG. 10, first, the CPU 16 determines whether or not the CPU 16 has received a switching signal from the host board 21 (step S11). When it is determined that no switching signal has been received (step S11; NO), the CPU 16 repeats the determination process of step S11 until the CPU 16 receives a switching signal. When it is determined in step S11 that the switching signal has been received (step S11; YES), the CPU 16 reads out the voltage values of the logic levels corresponding to the encoding method selected by the switching signal from the memory (not shown). Then, the CPU 16 sets the voltage value of each logic level in the register of the DSP 11 together with the encoding method (step S12). In step S12, the CPU 16 may output a control signal to the bias circuit 14 in order to cause the bias circuit 14 to output a DC bias voltage corresponding to the selected encoding method. When DML is used as the laser diode of the TOSA 13, the CPU 16 may output a control signal to the bias circuit 14 in order to cause the bias circuit 14 to output a bias electric current corresponding to the selected encoding method. Thus, the setting process is completed.

In the transmission control process shown in FIG. 11, first, the DSP 11 determines whether or not the DSP 11 has received transmission data for two lanes from the host board 21 (step S21). When it is determined that the transmission data has not been received (step S21; NO), the DSP 11 repeats the determination process of step S21 until the DSP 11 receives the transmission data. When it is determined in step S21 that the transmission data has been received (step S21; YES), the DSP 11 generates a PAM4 signal (step S22).

In step S22, the DSP 11 converts the transmission data into a PAM4 signal using the encoding method set by the CPU 16. Specifically, depending on the combination (B2, B1) of the bit B2 of the lane Tx2 and the bit B1 of the lane Tx1 received simultaneously from the host board 21, the DSP 11 converts (serializes) the combination (B2, B1) into a pulse having one of the logic levels of Level-0, Level-1, Level-2 and Level-3. At this time, the DSP 11 generates a pulse having a voltage value of the logic level set by the CPU 16. The DSP 11 generates a PAM4 signal by performing the above-mentioned conversion every time the DSP 11 receives one bit from each lane. Then, the DSP 11 sequentially outputs the PAM4 signals to the drive circuit 12.

Subsequently, upon receiving the PAM4 signal from the DSP 11, the drive circuit 12 generates a drive signal in accordance with the PAM4 signal (step S23). Then, the drive circuit 12 outputs the drive signal to the TOSA 13. Subsequently, upon receiving the drive signal from the drive circuit 12, the TOSA 13 generates an optical signal in accordance with the drive signal (step S24). In step S24, the laser diode is driven by the drive signal to generate the optical signal. The TOSA 13 transmits the optical signal to another optical transceiver via an optical fiber cable. Thus, the transmission control process is completed.

In the reception control process shown in FIG. 12, first, the ROSA 15 determines whether or not the ROSA 15 has received an optical signal from another optical transceiver via an optical fiber cable (step S31). When it is determined that no optical signal has been received (step S31; NO), the ROSA 15 repeats the determination process of step S31 until the ROSA 15 receives an optical signal. When it is determined in step S31 that an optical signal has been received (step S31; YES), the ROSA 15 converts the optical signal into a PAM4 signal (step S32). In step S32, the photoelectric conversion element converts the optical signal into an electrical signal to output the electrical signal to the amplifier. Then, the amplifier generates the PAM4 signal by amplifying the electrical signal output from the photoelectric conversion element. Then, the ROSA 15 outputs the PAM4 signal to the DSP 11.

Subsequently, upon receiving the PAM4 signal from the ROSA 15, the DSP 11 generates reception data based on the PAM4 signal (step S33). In step S33, the DSP 11 converts (deserializes) the PAM4 signal into reception data for two lanes using the encoding method set by the CPU 16. Specifically, for each symbol of the PAM4 signal, the DSP 11 compares the voltage value of the symbol with the threshold voltage to determine which logic level the symbol corresponds to. Then, the DSP 11 generates a combination (B2, B1) of the bit B2 of the lane Rx2 and the bit B1 of the lane Rx1 in accordance with the determined logic level. Then, the DSP 11 transmits a pulse indicating the bit B1 to the host board 21 via the lane Rx1, and transmits a pulse indicating the bit B2 to the host board 21 via the lane Rx2. Thus, the reception control processing is completed.

In the optical transceiver 1 and the method for controlling the optical transceiver 1 described above, a PAM4 signal is generated by converting a 2-bit bit string (bits B2 and B1) included in transmission data into a pulse signal having any one of four logic levels, a drive signal is generated in accordance with the PAM4 signal, and an optical signal is generated in accordance with the drive signal. In another optical transceiver, the optical signal is converted into a PAM4 signal, the PAM4 signal is decoded into the 2-bit bit string (bits B2 and B1), and bit B1 and bit B2 are transmitted via the lanes Rx1 and Rx2, respectively. In the optical transceiver 1, voltage values of four logic levels (Level-0 to Level-3) are set depending on an encoding method. For example, the difference in bit error rate between the lane Rx1 and the lane Rx2 can be reduced by setting the voltage value of each logic level in accordance with the error occurrence probability between lanes. As a result, the difference in reception sensitivity between the lane Rx1 and the lane Rx2 can be reduced.

Specifically, the DSP 11 sets the voltage values of Level-0 to Level-3 in accordance with the error occurrence probability. As the voltage difference between two logic levels adjacent to each other increases, the possibility that an erroneous determination occurs between the two logic levels decreases. For example, by increasing the voltage difference between two logic levels different from each other in a bit with a high error occurrence probability, the bit error rate of the bit is reduced. As described above, by setting the voltage values of Level-0 to Level-3 in accordance with the error occurrence probability, the difference in reception sensitivity between the lane Rx1 and the lane Rx2 can be reduced.

In the Institute of Electrical and Electronics Engineers (IEEE) P802.3bs, switching between the binary code and the gray code is required in order to maintain low power consumption and general versatility. The DSP 11 selects either the gray code or the binary code as an encoding method in accordance with the switching signal. The DSP 11 sets voltage values of Level-0 to Level-3 depending on the selected encoding method. According to this configuration, it is possible to provide the optical transceiver 1 conforming to IEEE P802.3bs. The voltage value of the logic level at which the reception sensitivity is optimal when the binary code is selected is different from the voltage value of the logic level at which the reception sensitivity is optimal when the gray code is selected. Therefore, when the voltage value of the optimum logic level is set in one of the encoding methods, the reception sensitivity is deteriorated in the other encoding method. On the other hand, in the optical transceiver 1, the voltage value of each logic level is set depending on the selected encoding method. Therefore, two encoding methods of the gray code and the binary code can be used without increasing the difference in reception sensitivity between the lane Rx1 and the lane Rx2.

In the gray code, bit B1 is changed between Level-0 and Level-1, and between Level-2 and Level-3. On the other hand, bit B2 is changed between Level-1 and Level-2. Therefore, bit B1 has a higher rate (number of times) of change between two logic levels adjacent to each other than bit B2. Therefore, when the voltage difference V(0−1) and the voltage difference V(2−3) are equal to the voltage difference V(1−2), the bit error rate of the bit B1 becomes higher than the bit error rate of the bit B2. With respect to this problem, when the gray code is selected as the encoding method, the voltage difference V(0−1) and the voltage difference V(2−3) are set to be larger than the voltage difference V(1−2). As a result, the possibility that an erroneous determination occurs between Level-0 and Level-1 and the possibility that an erroneous determination occurs between Level-2 and Level-3 can be reduced compared with the possibility that an erroneous determination occurs between Level-1 and Level-2. This makes it possible to reduce the difference between the bit error rate of bit B1 and the bit error rate of bit B2. As a result, the difference in reception sensitivity between the lane Rx1 and the lane Rx2 can be reduced.

In other words, when the gray code is selected as the encoding method, the error occurrence probability of bit B1 is higher than the error occurrence probability of bit B2. In this case, the DSP 11 sets the voltage values of Level-0 to Level-3 so that the voltage difference between two logic levels (between Level-0 and Level-1, and between Level-2 and Level-3) different from each other in bit B1 is larger than the voltage difference between other two logic levels (between Level-1 and Level-2) different from each other in bit B2. This makes it possible to reduce the difference between the bit error rate of bit B1 and that of bit B2. As a result, the difference in reception sensitivity between the lane Rx1 and the lane Rx2 can be reduced.

In the binary code, bit error rates of bits B1 and B2 can be equalized when the voltage difference V(0−1), the voltage difference V(1−2) and the voltage difference V(2−3) are equal to each other. Therefore, the DSP 11 sets the voltage values of Level-0 to Level-3 so that the voltage difference V(1−2) when the gray code is selected as the encoding method is smaller than the voltage difference V(1−2) when the binary code is selected as the encoding method. According to this configuration, when the gray code is selected as the encoding method, the possibility that an erroneous determination occurs between Level-0 and Level-1 and the possibility that an erroneous determination occurs between Level-2 and Level-3 can be reduced compared with the possibility that an erroneous determination occurs between Level-1 and Level-2. Therefore, it is possible to reduce the difference between the bit error rate of bit B1 and the bit error rate of bit B2. As a result, when the gray code is selected as the encoding method, the difference in reception sensitivity between the lane Rx1 and the lane Rx2 can be reduced.

The DSP 11 sets the voltage values of Level-0 to Level-3 so that the bit error rates of the bits B1 and B2 are equal to each other. Therefore, the difference in bit error rate between the lane Rx1 and the lane Rx2 is reduced. This makes it possible to reduce the difference in reception sensitivity between the lane Rx1 and the lane Rx2.

When an erroneous determination occurs between Level-1 and Level-2, a 2-bit error occurs in the binary code but a 1-bit error occurs in the gray code. Therefore, bit errors in optical transmission can be reduced by using the gray code.

It should be noted that the optical transmitter and the method for controlling the optical transmitter according to the present disclosure are not limited to the above-described embodiments.

The optical transceiver 1 does not have to include the ROSA 15. In this case, the optical transceiver 1 functions as an optical transmitter.

The encoding method that can be used by the DSP 11 is not limited to the gray code and the binary code. The DSP 11 may be capable of using another encoding method instead of the gray code. The DSP 11 may be capable of using another encoding method instead of the binary code. The DSP 11 may be configured to use three or more encoding methods.

In the above embodiments, the DSP 11 may be capable of using only one encoding method. For example, the DSP 11 may use only the gray code or may use only the binary code.

The drive circuit 12 may have a level shift function. In this case, the CPU 16 may set a voltage value of each logic level in the drive circuit 12.

PAM8, PAM16 and the like may be used as multi-level amplitude modulation. In other words, the DSP 11 generates a multi-level amplitude modulated signal by converting a M-bit (M is an integer of 2 or more) bit string included in the transmission data into a pulse signal having $2^M$ logic levels using a predetermined encoding method. The DSP 11 sets voltage values of $2^M$ logic levels depending on the encoding method. Also in this case, the DSP 11 sets voltage values of $2^M$ logic level in accordance with the error occurrence probability of each bit included in the bit string. For example, when the error occurrence probability of a first bit of the bit string is higher than the error occurrence probability of a second bit of the bit string, the DSP 11 sets voltage values of $2^M$ logic levels so that the voltage difference between two logic levels different from each other in the first bit is larger than the voltage difference between other two logic levels different from each other in the second bit. The DSP 11 sets voltage values of $2^M$ logic levels so that the bit error rates of first to M-th bits included in the M bits are equal to each other. The DSP 11 may set the voltage values of Level-0 to Level-3 in the same manner as the PAM4 even when a multi-level amplitude modulation other than the PAM4 is used.

REFERENCE SIGNS LIST

1 Optical transceiver (optical transmitter)
2 Host device
11 DSP (controller)
12 Drive circuit (driver)
13 TOSA (light emitter)
14 Bias circuit
15 ROSA
16 CPU
21 Host board
B1 Bit (first bit)
B2 Bit (second bit)
Rx1 Lane
Rx2 Lane
Tx1 Lane
Tx2 Lane

The invention claimed is:

1. An optical transmitter that outputs an optical signal which is multi-level amplitude modulated, the optical transmitter comprising:
a controller configured to generate a multi-level amplitude modulated signal based on transmission data that is binary data;
a driver configured to generate a drive signal in accordance with the multi-level amplitude modulated signal; and
a light emitter configured to generate the optical signal in accordance with the drive signal,
wherein the controller selects one of a first encoding method and a second encoding method in accordance with a switching signal,
wherein the controller generates the multi-level amplitude modulated signal by converting a bit string of M bits included in the transmission data into a pulse signal having $2^M$ logic levels using a selected encoding method,
wherein the controller sets voltage values of the $2^M$ logic levels depending on the selected encoding method,
wherein M is an integer of 2 or more,
wherein the controller sets the voltage values of the $2^M$ logic levels in accordance with an error occurrence probability that is a probability that an error occurs in each bit of the bit string when an erroneous determination occurs between two logic levels adjacent to each other among the $2^M$ logic levels, and
wherein when the error occurrence probability of a first bit of the bit string is higher than the error occurrence probability of a second bit of the bit string, the controller sets the voltage values of the $2^M$ logic levels so that a voltage difference between two logic levels different from each other in the first bit is larger than a voltage difference between other two logic levels different from each other in the second bit.

2. The optical transmitter according to claim 1,
wherein the controller sets the voltage values of the $2^M$ logic levels so that bit error rates of first to M-th bits included in the M bits are equal to each other.

3. The optical transmitter according to claim 1,
wherein the first encoding method is a gray code,
wherein the $2^M$ logic levels include a first logic level that is a lowest logic level, a second logic level that is a second lowest logic level, and a third logic level that is a third lowest logic level, and
wherein the controller sets the voltage values of the $2^M$ logic levels so that a voltage difference between the first logic level and the second logic level when the first encoding method is selected is larger than a voltage difference between the second logic level and the third logic level.

4. An optical transmitter that outputs an optical signal which is multi-level amplitude modulated, the optical transmitter comprising:
a controller configured to generate a multi-level amplitude modulated signal based on transmission data that is binary data;
a driver configured to generate a drive signal in accordance with the multi-level amplitude modulated signal; and
a light emitter configured to generate the optical signal in accordance with the drive signal,
wherein the controller selects one of a first encoding method and a second encoding method in accordance with a switching signal,
wherein the controller generates the multi-level amplitude modulated signal by converting a bit string of M bits included in the transmission data into a pulse signal having $2^M$ logic levels using a selected encoding method,
wherein the controller sets voltage values of the $2^M$ logic levels depending on the selected encoding method,
wherein M is an integer of 2 or more,
wherein the first encoding method is a gray code, and the second encoding method is a binary code,
wherein the $2^M$ logic levels include a first logic level that is a lowest logic level, a second logic level that is a second lowest logic level, and a third logic level that is a third lowest logic level, and wherein the controller sets the voltage values of the $2^M$ logic levels so that a voltage difference between the second logic level and the third logic level when the first encoding method is selected is smaller than a voltage difference between the second logic level and the third logic level when the second encoding method is selected.

5. A method for controlling an optical transmitter that outputs an optical signal which is multi-level amplitude modulated, the method comprising:
- a step of generating a multi-level amplitude modulated signal based on transmission data that is binary data;
- a step of generating a drive signal in accordance with the multi-level amplitude modulated signal; and
- a step of generating the optical signal in accordance with the drive signal, wherein in the step of generating the multi-level amplitude modulated signal, one of a first encoding method and a second encoding method is selected in accordance with a switching signal, and the multi-level amplitude modulated signal is generated by converting a bit string of M bits included in the transmission data into a pulse signal having $2^M$ logic levels using a selected encoding method, wherein voltage values of the $2^M$ logic levels are set depending on the selected encoding method, wherein M is an integer of 2 or more, wherein the voltage values of the $2^M$ logic levels are set in accordance with an error occurrence probability that is a probability that an error occurs in each bit of the bit string when an erroneous determination occurs between two logic levels adjacent to each other among the $2^M$ logic levels, and wherein when the error occurrence probability of a first bit of the bit string is higher than the error occurrence probability of a second bit of the bit string, the voltage values of the $2^M$ logic levels are set so that a voltage difference between two logic levels different from each other in the first bit is larger than a voltage difference between other two logic levels different from each other in the second bit.

6. A method for controlling an optical transmitter that outputs an optical signal which is multi-level amplitude modulated, the method comprising:
- a step of generating a multi-level amplitude modulated signal based on transmission data that is binary data;
- a step of generating a drive signal in accordance with the multi-level amplitude modulated signal; and
- a step of generating the optical signal in accordance with the drive signal, wherein in the step of generating the multi-level amplitude modulated signal, one of a first encoding method and a second encoding method is selected in accordance with a switching signal, and the multi-level amplitude modulated signal is generated by converting a bit string of M bits included in the transmission data into a pulse signal having $2^M$ logic levels using a selected encoding method, wherein voltage values of the $2^M$ logic levels are set depending on the selected encoding method, wherein M is an integer of 2 or more, wherein the first encoding method is a gray code, and the second encoding method is a binary code, wherein the $2^M$ logic levels include a first logic level that is a lowest logic level, a second logic level that is a second lowest logic level, and a third logic level that is a third lowest logic level, and wherein the voltage values of the $2^M$ logic levels are set so that a voltage difference between the second logic level and the third logic level when the first encoding method is selected is smaller than a voltage difference between the second logic level and the third logic level when the second encoding method is selected.

\* \* \* \* \*